United States Patent [19]

Cross

[11] 4,120,680

[45] Oct. 17, 1978

[54] METHOD OF HEAT TREATING GLASS IN A FLUIDIZED BED AND APPARATUS THEREFORE

[75] Inventor: Raymond Peter Cross, Preston, England

[73] Assignee: Pilkington Brothers Limited, St. Helens, England

[21] Appl. No.: 805,568

[22] Filed: Jun. 10, 1977

[30] Foreign Application Priority Data

Jun. 10, 1976 [GB] United Kingdom ............... 24124/76

[51] Int. Cl.² ............................................. C03B 27/00
[52] U.S. Cl. ...................................... 65/114; 65/348; 165/104 F
[58] Field of Search ................. 65/114, 117, 348, 349, 65/350, 351; 165/104 F

[56] References Cited

U.S. PATENT DOCUMENTS

| 2,940,735 | 6/1960 | Marsh ............................ 165/104 F X |
| 3,423,198 | 1/1969 | McMaster et al. ................. 65/114 X |
| 4,009,017 | 2/1977 | Jones ............................ 165/104 F X |

*Primary Examiner*—Arthur D. Kellogg
*Attorney, Agent, or Firm*—Burns, Doane, Swecker & Mathis

[57] ABSTRACT

A fluidized bed for the thermal treatment of glass articles is maintained in a quiescent uniformly expanded state of particulate fluidization by establishing a high pressure drop across a porous membrane through which fluidizing gas is supplied to the bed, of at least 60% of the pressure at which the fluidizing gas is supplied to a plenum chamber beneath the membrane.

9 Claims, 3 Drawing Figures

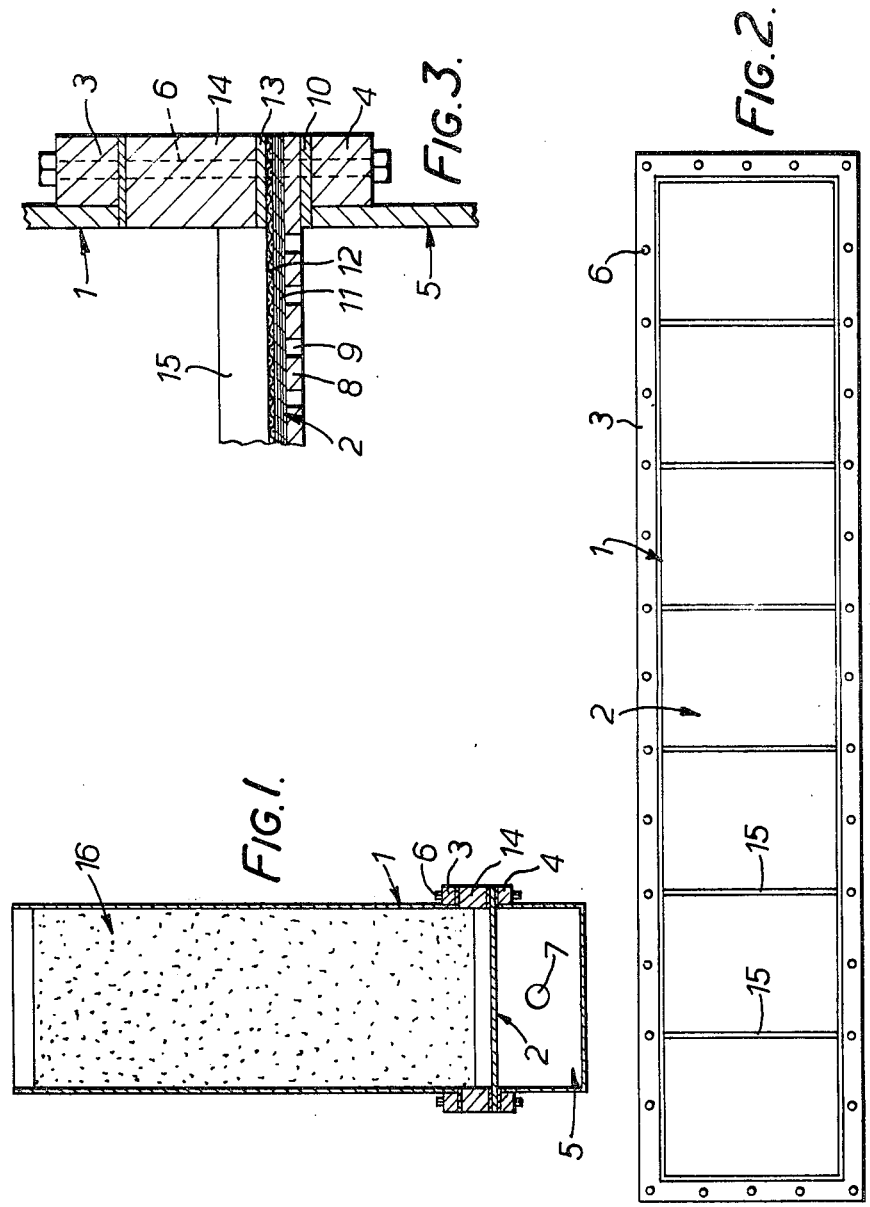

METHOD OF HEAT TREATING GLASS IN A FLUIDIZED BED AND APPARATUS THEREFORE

BACKGROUND OF THE INVENTION

1. Field of the Invention

This invention relates to fluidised beds, and more particularly to a method of operating a fluidised bed and to fluidised bed apparatus.

2. Description of the Prior Art

In U.S. patent application Ser. No. 717,171, filed Aug. 24, 1976, now abandoned the disclosure of which is incorporated herein by reference, there is described a method of thermally treating glass in which the hot glass is immersed in a fluidised bed of particulate material. Fluidisation of the particulate material is effected within a tank by passing fluidising gas through a porous membrane forming the base of the tank. Prior to immersion of the glass the fluidised bed is in a quiescent uniformly expanded state of particulate fluidisation.

The fluidised bed of particulate material in a quiescent uniformly expanded state of particulate fluidisation can be defined in terms of gas flow through the bed and the expanded height of the bed. the quiescent uniformly expanded state of particulate fluidisation has been found to exist between a lower limit of gas velocity at incipient fluidisation, that is the velocity at which the particles just become suspended in the uniformly distributed upwardly flowing gas, and an upper limit of gas velocity at which maximum expansion of the bed occurs and the top surface of the bed is tranquil and undisturbed by blubbing. A gas velocity higher than that which effects maximum expansion of the bed results in the development of extensive bubbling in the bed and at the onset of such bubbling there may be a partial reduction of the bed height.

The invention of the above-mentioned Patent Application is particularly applicable for the thermal toughening of flat or bent glass sheets, such as those used singly as motor vehicle windscreens, sidelights or backlights, or as part of a laminated motor vehicle windscreen, or for use in construction of windscreen assemblies for aircraft and railway locomotives.

In United Kingdom patent specification No. 774,305, thermal toughening of a glass sheet was proposed by a method in which a hot glass sheet is immersed in a freely bubbling bed of particulate material but such a process has not been brought into commercial use hitherto.

The problem which we have found when attempting to operate such a freely bubbling fluidised bed for the thermal toughening of glass sheets is the high incidence of fracture of the glass sheets which occurs during their treatment in the fluidised bed. A freely bubbling bed has also been found to distort the shape of the glass sheets due to the irregular forces to which the glass sheets are subjected in a freely bubbling bed.

By using a fluidised bed of particulate material which is in a quiescent uniformly expanded state of particulate fluidisation a successful commercial yield of whole glass sheets is achieved, there being very few fractures of the glass sheets while the toughening stresses are being developed in the glass sheets. It has also been found that the use of such a fluidised bed has very little effect on the shape of the glass sheets.

For maintaining stable operation of a fluidised bed in the quiescent uniformly expanded state of particulate fluidisation there is a narrow range of fluidising gas velocities, between the lower limit of gas velocity at incipient fluidisation and the upper limit of gas velocity at the bed has a maximum expansion. For gas velocities above the upper limit there is general bubbling of the bed. Within the velocity limits for fluidisation in a quiescent uniformly expanded state of particulate fluidisation it has been found difficult to avoid the occurrence of localised bubbling in the bed, which in some cases can engender general bubbling in the bed. Another form of instability which arises is that of the formation of irregular currents of material in the bed. Both these effects are difficult to suppress once started. Such instabilities are particularly prone to arise in deep, e.g. 1 meter deep, fluidised beds such as are required for the processing of large glass sheets, for example of suitable size of motor vehicle windscreens.

In a paper entitled "The Influence of the Gas Distributor on Bed Expansion, Bubble Size, and Bubble Frequency in Fluidised Beds" by D. Geldart, and J. R. Kelsey, I. Chem. E. Symposium Series No. 30 (1968) pages 114 to 125, there is a study of the types of instability occuring in bubbling fluidised beds of sand. The pressure drop across the distributor through which fluidising gas was supplied, and the geometry of that distributor was studied in terms of the stability of bubbling in a bed up to 1.5 meters deep. The distributors employed included a perforated plate with underlying paper layers, a combination of a perforated plate with a porous plate, and a porous plate alone. The ratio of the pressure drop across the distributor to the pressure drop across the bed for minimum fluidisation was in the range 0.017 to 9.9 for a cylindrical bed and in the range 0.0056 to 1.19 for a "two-dimensional" bed of rectangular cross section. For bubble-phase fluidisation observations were made with a range of values of that ratio from 0.08 to 23.0 for a cylindrical bed and from 0.023 to 5.35 for a "two-dimensional" bed. The authors concluded that at low values of the ratio of pressure drop across the distributor to pressure drop across the bed, there was instability of bubbling, and that increasing the ratio from 0.1 to 10, measured at minimum fluidisation, had no observable effect on the behaviour of the bed. With the distributors and pressure ratios described only bubbling fluidisation could be achieved and such beds are unsuitable for the thermal processing of large glass sheets.

In a book entitled "Fundamental Aspects of Fluidised Bed Coating" by Muharrem Elmas, Deletsche Hitgevers Maatschappii N.V., Delft, 1969, there is described the use of a shallow bed of polyethylene particles about 5 cm deep fluidised to a state of homogeneous fluidisation produced by varying the gas flow rate to a value in the range 1.0 to 1.4 producing minimum fluidisation. The pressure drop across the porous bronze plate used was at least equal to the weight of the bed. Hot objects of metal, glass ceramics or plastics were dipped into the bed in order to coat the objects. Such a bed has the disadvantage that the gas flow rate and pressure drop across the porous plate are inadequate to produce and maintain homogeneous fluidisation in a deep bed of material suitable for the thermal treatment of glass, in particular large sheets of glass for vehicle windscreens, sidelights or backlights.

It has also been proposed in United Kingdom Patent Specification No. 709,265 to employ rolled wire filter cloth as a gas-pervious support for a fluidised bed, with the pressure drop across the gas-pervious support of the same order as the pressure drop across the fluidised bed.

The present invention is based on the discovery that stable operation of a fluidised bed in a quiescent uniformly expanded state of particulate fluidisation can be obtained by appropriate choice of membrane to create a high pressure drop across the membrane due to the flow of fluidising gas through the porous membrane through which the fluidising gas enters the bed.

It is a main object of the invention to employ this discovery for improving stability of maintenance of a fluidised bed in a quiescent uniformly expanded state of particulate fluidisation for thermally treating glass articles.

It is another object of the invention to promote uniform gaseous flow into the particulate material to be maintained as a deep homogeneous bed in said quiescent uniformly expanded state of particulate fluidisation.

SUMMARY

The invention provides a method of operating a fluidised bed of particulate material, for example for thermally treating a glass article by immersing the article in a fluidised bed of particulate material in a quiescent uniformly expanded state of particulate fluidisation. A high pressure drop is established in the fluidising gas flow across a porous membrane through which fluidising gas is supplied to the bed, of at least 60% of the pressure at which the fluidising gas is supplied beneath the membrane.

The high pressure drop may be 85% of the pressure at which the fluidising gas is supplied beneath the membrane.

Further according to the invention, the fluidised bed may be of particulate material of particle density at least 1.0 g/cm$^3$ and may be of depth, at least 60 cm, sufficient for submersion of a hot glass sheet to be toughened.

The bed is maintained throughout its whole depth in said quiescent state by uniform distribution of fluidising gas flow upwardly from the upper face of the porous membrane.

The invention also comprehends fluidised bed apparatus including a membrane separating a plenum chamber to which fluidising gas is supplied, from a container for the fluidised bed, wherein the membrane comprises a perforated rigid member supporting a plurality of layers of material having a low permeability to gas flow such that the pressure drop in the fluidising gas flow across the porous membrane is at least 60% of the pressure at which fluidising gas is supplied to the plenum chamber.

Preferably the layers of low permeability material are layers of paper.

The membrane may include a protective covering laid on top of the layers of paper. The protective covering may be wire mesh.

Because the pores in the paper are very fine and the paper has a low and uniform permeability a high pressure drop exists across the membrane. It is believed that this is a factor which contributes to stable operation of the fluidised bed in the quiescent uniformly expanded state of particulate fluidisation.

Because of the high pressure drop across the membrane the layers of paper may be liable to bulge upwardly at the centre of the membrane. This could give rise to instability in operation of the fluidised bed.

Such distortion may be prevented by the provision of stiffening means which engages the upper surface of the membrane and presents minimal hinderance to the flow of fluidising gas through the membrane. In a preferred arrangement the stiffening means comprises thin plate members which extend on edge across the upper surface of the membrane.

BRIEF DESCRIPTION OF THE DRAWINGS

An embodiment of the invention will now be described, by way of example, with reference to the accompanying drawings in which:

FIG. 1 illustrates diagrammatically a vertical section through fluidised bed apparatus including a high pressure drop membrane in accordance with the invention, FIG. 2 is a plan view of the apparatus of FIG. 1, and FIG. 3 is a detail in section of part of FIG. 1.

DESCRIPTION OF THE PREFERRED EMBODIMENTS

Referring to the drawings the fluidised bed apparatus shown includes a rectangular tank 1 which is a container for a fluidised bed. A microporous membrane 2, which is described in greater detail with reference to FIG. 3, extends across the base of the tank 1. The edges of the membrane 2 are fixed between a flange 3 on the tank 1 and a flange 4 on a plenum chamber 5 which forms the base of the tank 1. The flanges 3, 4 and the edges of the membrane 2 are bolted together by bolts 6. The membrane 2 thus separates the plenum chamber 5 from the container for the fluidised bed. A gas inlet duct 7 is connected to the plenum chamber 5 and fluidising air is supplied to the duct 7 at a regulated pressure.

A preferred construction of the microporous membrane 2 is shown in FIG. 3 and comprises a steel plate 8 having a regular distribution of holes 9. The margins of the plate 8 are drilled to provide passages for the bolts 6. A gasket 10 is located between the lower face of the margins of the plate 8 and the flange 4 on the plenum chamber 5.

A number of layers of strong microporous papers are laid on the plate 8. The membrane 2 includes a protective woven wire mesh 12 which is laid on top of the layers of paper 11. An upper gasket 13 is located between the margins of the wire mesh 12 and a spacer collar 14 located between the membrane 2 and the flange 3 on the tank 1. Stiffening means in the form of thin steel plates 15 engages the upper surface of the membrane and presents minimal obstruction to the flow of fluidising gas through the membrane. The plates 15 extend across the base of the tank 1 and are welded at their ends to the collar 14. The plates 15 extend on edge across the upper surface of the membrane, and are in edge contact with the upper surface of the membrane 2. In the preferred embodiment the plates 15 are 5.0 cm in depth and 0.6 cm in thickness.

In operation of the apparatus shown in FIGS. 1 and 2 particulate material 16 in the tank 1 is fluidised by feeding fluidising air at a regulated pressure into the plenum chamber 5 through the inlet duct 7. The membrane 2 is so constructed that fluidising air flows uniformly into the fluidised bed over the whole of the base of the bed to maintain the bed in a quiescent uniformly expanded state of particulate fluidisation.

The particulate material 16 which constitutes the fluidised bed is an inert refractory material for example $\gamma$-alumina of particle size in the range 20 $\mu$m to 160 $\mu$m, the mean particle size being 64 $\mu$m. Other particulate materials which are suitable are disclosed in the above-mentioned patent application.

The bed may be at least 60 cm deep. For example the size of the tank 1 holding the fluidised bed was 38 cm × 215 cm × 100 cm deep.

The membrane 2 was made up from 15 layers of paper 11 each layer of paper 11 was 0.23 mm thickness and having an air permeability at normal temperature of 4.6 l/s/m² at an applied pressure of 1.0 kN/m².

The fluidising air was fed into the plenum chamber 5 at a pressure of 24 kN/m². The resultant pressure drop through the member 2 was 14.4 kN/m² and the pressure drop through the depth of the fluidised bed was 9 kN/m². The pressure drop across the membrane 2 was 60% of the feed air pressure in the plenum chamber 5. The fluidised bed surface was near the top of the tank.

The high pressure drop which exists across the membrane 2 provides a uniform distribution of fluidising gas flowing upwardly from the upper face of the membrane 2 in the tank 1 so as to maintain the particulate material 16 in a quiescent uniformly expanded state of particulate fluidisation. By control of the plenum pressure in the plenum chamber 5, sensitive regulation of the velocity of upward gas flow through the particulate material is achieved. The particulate material is placed in the quiescent uniformly expanded state of particulate fluidisation through control of the plenum pressure such that the gas velocity through the bed is between that velocity corresponding to incipient fluidisation and that velocity corresponding to maximum expansion of the bed in which said quiescent state of fluidisation is maintained.

The range of fluidising gas velocities in which such a state of fluidisation is obtained is narrow and any nonuniformity of fluidising gas flow rate into the particulate material might result in localised bubbling within the bed in regions where the fluidising gas velocity may exceed the upper limit of the range. Such localised bubbling can engender overall bubbling in the bed.

Also any non-uniformity of gas flow might set up random flows of the particulate material within the bed.

These forms of instability, observed hitherto, can give rise to difficulties when toughening glass sheets by immersion of the hot glass sheets in the fluidised bed. Fracture of the glass sheets can be caused or unacceptable changes in shape may result in the glass sheets.

The construction of the membrane 2, as shown in FIG. 3, is such that although there may be localised variations in the porosity of the individual layers of paper 11 making up the membrane these variations are averaged out because the membrane comprises a plurality of layers of paper. The result of the high pressure drop which exists across the membrane and of the average uniform fine porosity of the membrane, is that there is a very uniform distribution of air velocity through the upper face of the membrane. This results in the particulate material being maintained in a stable quiescent uniformly expanded state of particulate fluidisation between the state of incipient fluidisation and the state of maximum expansion of the bed corresponding to the onset of bubbling in the bed.

The high resistance to air flow of the membrane 2 minimises the effect of any transient changes which may occur in the pressure of the air fed into the plenum chamber 5. Such changes could otherwise result in changes in the velocity of fluidising air emerging through the membrane 2 into the fluidised bed, and could give rise to instabilities in operation of the bed.

By way of comparison a fluidised bed of similar size and of the same particulate material has been operated using a low pressure drop membrane comprising a single sheet of porous plastics material. This membrane material had a much greater permeability to air flow than the corresponding permeability of the membrane used in the fluidised bed apparatus in accordance with the present invention. The air feed pressure required to establish fluidisation of the bed material in a quiescent uniformly expanded state of particulate fluidisation was 10 kN/m² and the resultant pressure drop through the depth of the fluidised bed was 9 kN/m². Thus the pressure drop through the membrane was only 1 kN/m² which is only 10% of the air feed pressure. This bed was found to be very unstable in operation. Instabilities took the form of localised bubbling, and the setting up of random currents of material within the bed which could not be suppressed by reduction of the air feed pressure. When such instabilities occurred it was necessary to shut off the feed of fluidising air to the bed, thus allowing the bed to collapse and then to refluidise the bed. However it was found that the instabilities arose again shortly after fluidisation of the bed.

It has been found, in operation of the method of the invention, that the higher the pressure drop which is established across the membrane 2 the better is the stability of fluidisation of the particulate material, up to a limit beyond which there is no improvement in stability. A membrane has been used comprising 20 layers of 0.05 mm thick paper having an air permeability of 0.25 l/s/m² at normal pressure of 0.1 kN/m². For fluidisation of the γ-alumina material referred to above to a depth of 100 cms an air feed pressure of 52 kN/m² was required.

The resultant pressure drop through the depth of the fluidised bed was again 9 kN/m², the pressure drop through the membrane being 43 kN/m². In this case the pressure drop through the membrane was 85% of the air feed pressure. The membrane can be constructed so that there is an even higher pressure drop than 85%, the only limitation on the percentage pressure drop to be used being that imposed by the resistance of the membrane to distortion by the pressure in the plenum chamber.

It has also been found that as the percentage pressure drop across the membrane is increased the upper limit of gas velocity at which maximum expansion of the bed occurs before the onset of bubbling, also increases up to a limit. The invention provides an enhanced range of gas velocities within which the bed can be operated in the quiescent uniformly expanded state of particulate fluidisation. This also enhances the stability of operation of the bed.

Some examples of operation are set out below.

Two kinds of paper were used in constructing the membrane as follows:

Paper A

Thickness = 0.23 mm
Air Permeability = 0.54 l/s/m² at 0.1 kN/m².

Paper B

Thickness = 0.05 mm
Air Permeability = 0.25 l/s/m² at 0.1 kN/m².

Working with γ-alumina of particle density 2.2 g/cm³, particle size range 20 μm to 160 μm, and mean particle size 64 μm, three experiments were conducted as follows:

Table I

| Paper | Membrane Number of Layers | Plenum Pressure KN/m² | Pressure drop across Membrane KN/m² | % | Depth of bed cm |
|---|---|---|---|---|---|
| A | 15 | 16.4 | 11.4 | 69.5 | 60 |
| B | 10 | 35.1 | 26.8 | 76 | 100 |
| B | 20 | 50.3 | 37.5 | 74 | 150 |

Similar experiments with a porous powdered aluminosilicate material, each particle containing 13% by weight alumina and 86% silica, with particle size range up to 150 μm, mean particle size 60 μm and particle density 1.22 g/cm³, gave the following results Table II

| Paper | Membrane Number of Layers | Plenum Pressure kN/m² | Pressure drop across Membrane kN/m² | % | Depth of bed cm |
|---|---|---|---|---|---|
| A | 15 | 8.65 | 6.0 | 69.5 | 60 |
| B | 10 | 18.4 | 14.0 | 76 | 100 |
| B | 20 | 29.1 | 22.3 | 74 | 150 |

Further experiments were carried out with non-porous α-alumina of mean particle size 29 μm and particle density 3.97 g/cm³. The results were as follows Table III

| Paper | Membrane Number of Layers | Plenum Pressure kN/m² | Pressure drop across Membrane kN/m² | % | Depth of bed cm |
|---|---|---|---|---|---|
| A | 20 | 20.9 | 12.9 | 61.5 | 60 |
| B | 10 | 38.5 | 25.2 | 65 | 100 |
| B | 20 | 56.0 | 35.6 | 63 | 150 |

It was found that the percentage pressure drop across the membrane is related to the toughening stresses induced in a glass sheet quenched in the fluidised bed. The higher the pressure drop, up to a permissible limit, the nearer does the state of the bed become to a state of maximum expansion at which the quiescent state of fluidisation is maintained. At maximum expansion the bed is of low viscosity so that the hot glass sheets can enter the bed easily with minimum effect on the bent or flat shape of the sheet. The nearer the state of the bed approaches to maximum expansion, the higher the central tensile stress in the glass as illustrated by the following Table IV which gives the result of experiments using the same γ-alumina material as was used when carrying out the experiments of Table I. Sheets of glass 3 mm thick were heated to 660° C. and lowered into the bed which was 60 cm deep and was at ambient temperature or just above.

Table IV

| Pressure drop across Membrane % | Paper B Number of Layers | Bed Expansion % | Central Tensile Stress MN/m² |
|---|---|---|---|
| 69 | 5 | 15 | 41 |
| 82 | 10 | 18 | 44 |
| 88 | 20 | | 49 |

In general the pressure drop of at least 60% across the membrane 2 makes possible the thermal treatment of glass articles, in particular the toughening of glass sheets for vehicle windscreens, in a fluidised bed at least 60 cm deep, for example of depth in the range 60 cm to 150 cm, of particulate material having a particle density of at least 1.0 g/cm³, for example in the range 1.0 g/cm³ to 4.0 g/cm³, which bed is in a quiescent uniformly expanded state of particulate fluidisation.

I claim:

1. In a method of thermally treating a glass article by immersing the article in a fluidised bed of particulate material in a quiescent uniformly expanded state of particulate fluidisation, which bed has a tranquil top surface through which the article is lowered as it is immersed in the bed, the improvement comprising:
   establishing a high pressure drop in the fluidising gas flow across a porous membrane through which fluidising gas is supplied to the bed uniformly over the whole of the base of the bed, said high pressure drop being at least 60% of the pressure at which the fluidising gas is supplied beneath the membrane and being sufficient to produce a uniform distribution of fluidising gas flow upwardly from the upper face of the porous membrane through the depth of the fluidised bed to maintain the bed stable in said quiescent state of fluidisation.

2. A method according to claim 1, wherein said high pressure drop across the membrane is 85% of the pressure at which the fluidising gas is supplied beneath the membrane.

3. A method of thermally toughening a glass sheet comprising:
   heating the sheet to a temperature near to its softening point;
   immersing the hot sheet in a fluidised bed of particulate material of particle density at least 1.0 g/cm³ and of sufficient depth, at least 60 cm, to envelop the sheet;
   maintaining said fluidised bed at a temperature which develops toughening stresses in the sheet; and
   maintaining said fluidised bed in a quiescent uniformly expanded state of particulate fluidisation by establishing a pressure drop in the fluidising gas flow across a porous membrane through which fluidising gas is supplied to the bed uniformly over the whole of the base of the bed, which pressure drop is at least 60% of the pressure at which the fluidising gas is supplied beneath the membrane and is sufficient to produce a uniform distribution of fluidising gas flow upwardly from the upper face of the porous membrane through the depth of the fluidised bed to maintain the bed stable in said quiescent state of fluidisation.

4. A method of thermally toughening a a glass sheet comprising:
   quenching a hot glass sheet in a fluidised bed of particulate material of particle density at least 1.0 g/cm³, which bed is in a quiescent uniformly expanded state of particulate fluidisation and is of depth, at least 60 cm, sufficient for submersion of the sheet;
   lowering the hot glass sheet vertically into the bed until it is submerged therein; and maintaining the bed stable throughout its depth in said quiescent uniformly expanded state by uniform distribution over the whole of the base of the bed of fluidising gas flowing upwardly from the upper face of a porous membrane across which membrane there is a pressure drop of at least 60% of the pressure at which the fluidising gas is supplied beneath the membrane.

5. Fluidised bed apparatus comprising:
   a container for the fluidised bed;
   a plenum chamber;

means for supplying fluidising gas to the plenum chamber; and a membrane separating the container from the plenum chamber and having an upper surface which forms the whole base of the container, which membrane comprises a perforated rigid member supporting a plurality of layers of material having a low permeability to gas flow such that the pressure drop in the fluidising gas flow across the membrane is at least 60% of the pressure at which fluidising gas is supplied to the plenum chamber, and the upper surface of which membrane produces a uniform distribution of fluidising gas flow upwardly through the fluidised bed.

6. Apparatus according to claim 5, wherein the layers of low permeability material are layers of paper.

7. Apparatus according to claim 5, further comprising stiffening means which engages the upper surface of the membrane and presents minimal hinderance to the flow of fluidising gas through the membrane.

8. Apparatus according to claim 7, wherein the stiffening means comprises thin plate members which extend on edge across the upper surface of the membrane.

9. Fluidised bed apparatus according to claim 7 comprising, in said container, a fluidised bed of particulate material of particle density at least 1.0 g/cm$^3$ in a quiescent uniformly expanded state of particulate fluidisation and of sufficient depth, at least 60 cm, for submersion therein of a hot vehicle windscreen glass for toughening by heat transfer to the bed, which quiescent uniformly expanded state of fluidisation is maintained stable through the whole depth of the bed by the uniform flow of fluidising gas upwardly from the whole of the base of the bed from the upper face of the porous membrane.

* * * * *